Dec. 27, 1927. J. F. MAKOWSKI Re. 16,831

LATHING STRUCTURE FOR PLASTER WALLS

Original Filed July 2, 1925

INVENTOR

John F. Makowski

BY Percy S. Webster

ATTORNEY

Reissued Dec. 27, 1927. Re. 16,831

UNITED STATES PATENT OFFICE.

JOHN F. MAKOWSKI, OF STOCKTON, CALIFORNIA, ASSIGNOR, BY MESNE ASSIGNMENTS, TO FIRE PROOF WALL COMPANY, OF RENO, NEVADA, A CORPORATION.

LATHING STRUCTURE FOR PLASTER WALLS.

Original No. 1,579,377, dated April 6, 1926, Serial No. 40,986, filed July 2, 1925. Application for reissue filed November 12, 1927. Serial No. 232,926.

This invention relates to improvements in partition walls and particularly to that type commonly installed in class A buildings. In this type of building the main fire proof walls, floors and ceilings are put up in usual form and then the partition or division walls are built in place as desired to make the rooms within the building.

In the interest of space saving it is necessary that these partition walls be as narrow as possible, usually two inches solid connecting partition walls and four inch hollow corridor partitions, and at the same time they must be strong and fire proof.

It is now the usual custom to erect these partition walls as follows:

Small channel iron studs about three quarters of an inch wide by three-eighths of an inch thick are inserted between the floor and ceiling and suitably anchored. Sheets of expanded metal lath are then fastened to the vertical channel irons, and plastered over. Where the metal lath is thus used, it is necessary, in order to make the wall strong enough, that the joints of the lath be made at the channel iron in order that they may be properly supported. If the joints were made between the studs the metal lath would be inclined to flex or bulge at such joints, which would be fatal either in erecting or maintaining the wall.

In tying the metal lath together and to the studs the wire ties are placed about six inches apart and it requires the services of very experienced men to accomplish a good day's work in placing the lath. This renders the work slow and expensive.

It is to overcome these difficulties and to secure other advantages, to be hereinafter enumerated, and at the same time to produce an economical, strong and substantially fire proof wall that I have conceived of the present invention.

My method of wall building can also be carried out into the ceiling structure, as will appear from the following description.

I carry out the concept of the invention by the construction and relative arrangement of parts as set forth in the drawings, and hereinafter described and claimed.

In the drawings similar characters of reference indicate corresponding parts in the several views.

Referring now to the drawings.

Figure 1:
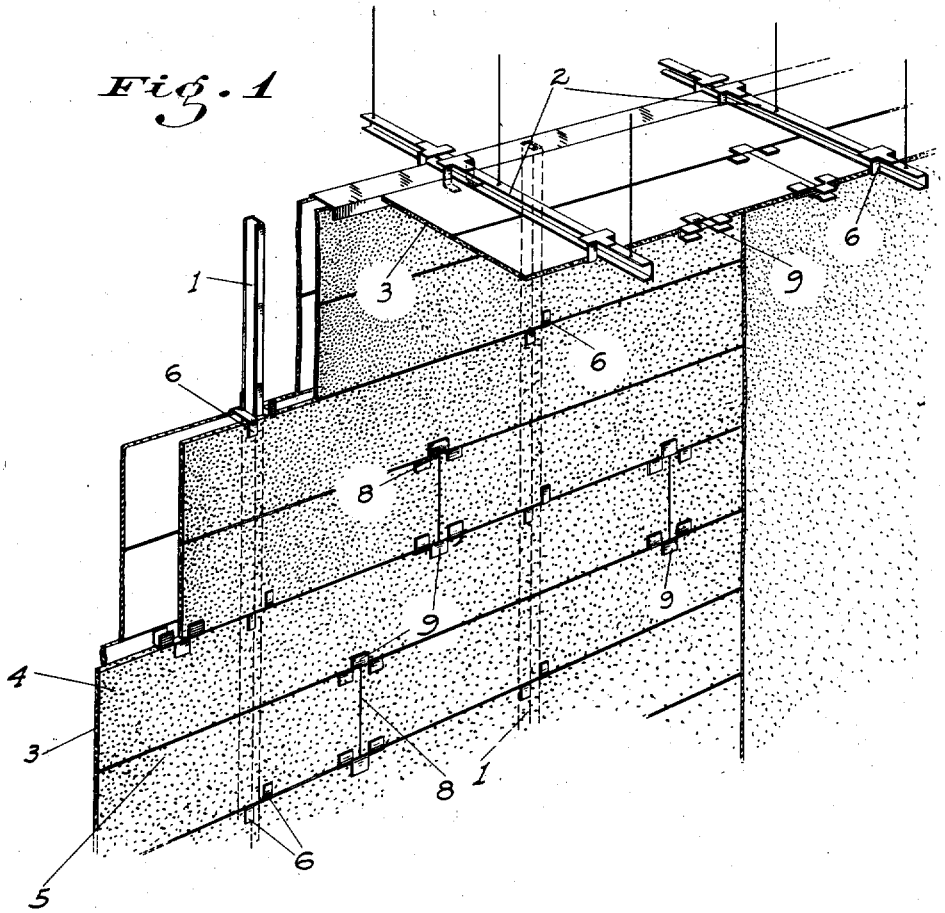
Fig. 1 is a fragmentary view of a wall and ceiling in perspective showing my improved construction.
Figure 2:
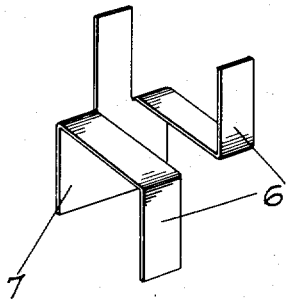
Fig. 2 is a perspective view of a clip for securing my lathing to the channel irons.
Figure 3:
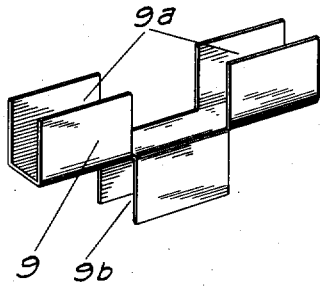
Fig. 3 is a perspective view of a clip used for fastening the lath together at the joints thereof between the channel iron studs.

Referring now more particularly to the characters of reference on the drawings, the numeral 1 designates the channel iron studs which are positioned and fastened between the floor and ceiling where the wall is to be built or suspended from suitable supports 2 where my lathing method is carried into the ceiling.

The essential element of my invention is the plaster lath used and the method of installing and supporting it relative to the channel iron studding.

The lath which I propose to use is that made of so-called plaster wall board or the like. The particular type of board preferred is that wherein a center core of plaster 3 is rolled between surface sheets 4. This board when made is approximately three eights of an inch thick and is substantially inflexible when cut into laths of six to eight feet in length and one half foot to a foot and a half wide. On the surface of such laths is a key surface 5 such as gravel or the like, as for instance of that type shown in my Patent No. 1,505,399, dated August 19th, 1924.

The strips of lath made as above are secured to the studding 1 in the following manner:—

The flat of the lath is set against a plurality of the studs at points intermediate the ends of the lath. The lath thus set is clinched to the studding by means of prongs 6 on a clip plate 7. These prongs fit on each side of the studding and between adjacent laths. The prongs are bent up and down respectively so that they may be slipped over the lath to hold it against the studding.

The laying of the flat strip of lathing across the face of the studs and there fastening it as shown, leaves the free ends of the strip to terminate at any point irrespective of the studs. Then the next succeeding strip is laid across and fastened to the succeeding studs with its end butted against the adjacent end of the other strip in the same plane so that when the lath structure is complete the aggregation of strips present a plane surface with no overlaps or projections. In the course of construction the butted vertical joints 8 between the laths of one row are preferably arranged in offset or broken relation with respect to those of adjacent rows. Inflexible connection between the butt joints of a row and also between the rows are made as follows:

I provide clips 9 having opposed channels $9^a$ and $9^b$. In using the clips the channels $9^a$ are engaged with adjacent lath ends on each side of one of the joints 8, while the channels $9^b$ engage the edge of the lath in the next row below or above the same at some point intermediate the ends of such lath.

It will thus appear that since the relative inflexible laths are fastened to the rigid studs at points intermediate the ends of such laths and that the free ends of the laths are each clipped together and the laths of one row are clipped to the edge of the other inflexible laths at points intermediate the offset ends of the latter, the whole lath support for the plaster of the walls and ceiling becomes substantially a solid inflexible wall in itself which will not flex or bulge either while the plaster is being adhered thereto or after the wall or ceiling is completely finished.

Attempts to use laths of plaster board in the type of wall described have heretofore been made. They all failed of commercial success however since they involved the principle of placing widths of plaster board between the studs and joining the edges of the same to the studs. This method with wall board plaster lath is just as hard of accomplishment and as much or more expensive as the method used with metal lath.

The principal mechanical advantages gained by my new construction are that by the connection of adjacent lath ends to each other, and likewise the clipping of edges of relatively inflexible lath members in adjacent rows, lath boards are able to be placed across and fastened against the face of the metal studding without overlapping joints or projections as indicated, thereby having the following results:

It makes a smooth plastering surface.

It reinforces partitions or ceilings for the reason that each lath board lies across and is fastened to several studs.

It eliminates vertical fractures in the wall owing to its broken or offset joint construction.

Owing to its being placed on the outside face of metal studding it gives one inch additional pipe space in a four inch hollow corridor partition.

In using my improved structure it is unnecessary to pay any particular attention to the exact spacing of the studs and likewise they may be spaced a greater distance apart than where metal lath is used, whereas in the use of metal lath the studs must be accurately spaced and relatively much closer together on account of the flexibility of the metal lath.

Also the inflexibility of the lath coupled with the method of laying the flat of the lath across, against and fastening it to the studs renders it unnecessary to be careful as to whether or not the joints between the lath ends come at or near the studs or elsewhere. With metal lath they must be at a stud.

The principal commercial gain in the use of plaster board over metal lath is the fact that its finished work is cheaper for the reason that it takes three coats of plaster to finish metal lath, whereas two coats is all that is necessary to finish plaster lath. The method of construction with metal lath is first to apply the metal lath to the metal studs and then apply a scratch coat of plaster which is the hardest and most difficult of all three coats to apply. When the scratch coat is applied the metal lath construction is just then in the same relative condition as the plaster lath construction. The scratch coat gives it a body, strengthens the wall and gives something to work against. The plaster lath as applied to the metal studs and before any plaster is applied thereon is in the same condition as the metal lath after this expensive scratch coat has been applied.

A plaster lath partition is also more soundproof than a metal lath partition owing to the fact that it has two paper facing sheets.

As already stated, in the metal lath partition the wire ties are made about six inches apart and it takes a very experienced man to accomplish a good day's work on metal lath. On plaster lath only half this number of ties are necessary on account of the rigidity of the plaster board itself and as the ties are made out of metal already formed it is easier to place one single metal clip on plaster lath than to make a wire tie on metal lath, thus reducing both the number of ties required and also the labor of application.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A lathing structure for plaster walls comprising supporting studs, lathing strips laid across the front faces of the studs and overlapping the same so that the free ends of adjacent strips meet at points between and unsupported by a stud, means for securing such free meeting and unsupported ends together, and means securing the strips in place against the faces of the studs.

2. A lathing structure for plaster walls comprising supporting studs, rows of lathing strips laid across the front faces of the studs, the strips of each row overlapping the studs so that the free ends of the adjacent strips in each row will meet at points between and unsupported by a stud, the joints between meeting ends of the strips in one row being offset with respect to those in an adjacent row, and a common element fastening a pair of meeting ends of the strips in one row to each other and to the horizontal edge of the strip in the adjacent row; and means for securing the strips in place against the faces of the studs.

3. A lathing structure for plaster walls comprising supporting studs, lathing strips laid across the front faces of the studs, and overlapping the same, and means whereby the strips may be secured in place against such faces of the studs at whatever point they may chance to be laid thereagainst.

4. A lathing structure for plaster walls comprising supporting studs, lathing strips laid across the front faces of the studs, and overlapping the same, means whereby the strips may be secured in place against such faces of the studs at whatever point they may chance to be laid thereagainst, such means including clips to embrace the stud, and prongs on the clips to project over the free edges of the strips and capable of being bent into engagement therewith.

5. A lathing structure for plaster walls comprising supporting studs, lathing strips laid against the front faces of the studs and crossing the same at right angles thereto, clips embracing the studs and having prongs projecting over the edges of the strips where they cross the studs, the prongs being bent into engagement with the strips at such crossing points to clamp the strips against the studs.

In testimony whereof I affix my signature.

JOHN F. MAKOWSKI.